(12) United States Patent
Smith et al.

(10) Patent No.: US 11,199,845 B2
(45) Date of Patent: Dec. 14, 2021

(54) SYSTEM AND METHOD FOR DISTRIBUTING AND COMPRESSING CROP MATERIAL FOR ENSILAGE

(71) Applicant: CNH Industrial America LLC, New Holland, PA (US)

(72) Inventors: Kevin M. Smith, Narvon, PA (US); John H. Posselius, Ephrata, PA (US); Cory Douglas Hunt, Millersville, PA (US); Christopher A. Foster, Mohnton, PA (US); Joshua David Harmon, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 461 days.

(21) Appl. No.: 16/293,031

(22) Filed: Mar. 5, 2019

(65) Prior Publication Data
US 2020/0285241 A1 Sep. 10, 2020

(51) Int. Cl.
*G05D 1/02* (2020.01)

(52) U.S. Cl.
CPC ......... *G05D 1/0219* (2013.01); *G05D 1/0246* (2013.01); *G05D 1/0257* (2013.01); *G05D 1/0278* (2013.01); *G05D 2201/0201* (2013.01)

(58) Field of Classification Search
CPC .. G05D 1/0219; G05D 1/0246; G05D 1/0257; G05D 1/0278; G05D 2201/0201
See application file for complete search history.

(56) References Cited

U.S. PATENT DOCUMENTS

| 4,269,022 A | * | 5/1981 | Adams | A01D 46/28 100/121 |
|---|---|---|---|---|
| 4,600,999 A | | 7/1986 | Ito et al. | |
| 4,732,332 A | | 3/1988 | Schuitemaker | |

(Continued)

FOREIGN PATENT DOCUMENTS

| DE | 2330444 | 9/1975 |
|---|---|---|
| DE | 102006054083 | 5/2008 |

(Continued)

OTHER PUBLICATIONS

Ministry of Agriculture, "Planning a Horizontal Silo for Beef Operations," Order No. 372300-3, Dec. 2015, https://www2.gov.bc.ca/assets/gov/farming-natural-resources-and-industry/agriculture-and-seafood-management/structures-and-mechanization/300-series/372300-3_planning_a_horizontal_silo_for_beef_operations.pdf 6 pages.

(Continued)

*Primary Examiner* — Behrang Badii
(74) *Attorney, Agent, or Firm* — Rickard K. DeMille; Rebecca L. Henkel

(57) ABSTRACT

In one aspect, a method for distributing crop material for ensilage may include determining, with a computing device, a storage volume for the crop material. The method may also include dividing, with the computing device, the determined storage volume into a plurality of planes. Each plane of the plurality of planes may be spaced apart from each other plane of the plurality of planes along a vertical direction. Furthermore, the method may include controlling, with the computing device, an operation of at least one of a work vehicle or an associated implement in a manner that distributes a portion of the crop material on a given plane of the plurality of planes.

18 Claims, 6 Drawing Sheets

(56) References Cited

U.S. PATENT DOCUMENTS

| | | |
|---|---|---|
| 5,471,391 A | 11/1995 | Gudat et al. |
| 5,978,723 A | 11/1999 | Hale et al. |
| 6,128,574 A | 10/2000 | Diekhans |
| 6,389,785 B1 | 5/2002 | Diekhans et al. |
| 6,697,724 B2 | 2/2004 | Beck |
| 6,986,294 B2 | 1/2006 | Fromme et al. |
| 7,707,003 B2 | 4/2010 | O'Connor et al. |
| 8,498,788 B2 | 7/2013 | Kondekar |
| 8,924,097 B2 | 12/2014 | Steckel et al. |
| 9,392,746 B2 | 7/2016 | Darr et al. |
| 9,516,806 B2 | 12/2016 | Yamauchi et al. |
| 2010/0245074 A1 | 9/2010 | Green et al. |
| 2011/0147497 A1* | 6/2011 | Hiddema ............ A01M 7/0014 239/722 |
| 2016/0076222 A1 | 3/2016 | Taylor et al. |
| 2017/0364089 A1 | 12/2017 | Strautmann et al. |
| 2018/0320967 A1* | 11/2018 | Kaloudis ................ G06F 17/13 |

FOREIGN PATENT DOCUMENTS

| | | |
|---|---|---|
| DE | 102007053610 | 5/2009 |
| EP | 2198688 | 6/2010 |
| EP | 2832207 | 2/2015 |
| WO | WO2011160631 | 12/2011 |
| WO | WO2013148290 | 10/2013 |

OTHER PUBLICATIONS

Bolton et al., "Management of Bunker Silos and Silage Piles," http://citeseers.ist.psu.edu/viewdoc/dowoload?doi=10.1.1.569.1714&rep=rep1&type=pdf 23 pages.

* cited by examiner

SYSTEM AND METHOD FOR DISTRIBUTING AND COMPRESSING CROP MATERIAL FOR ENSILAGE

FIELD OF THE INVENTION

The present disclosure generally relates to systems and methods for ensiling crop material and, more particularly, to systems and methods for controlling the operation of a work vehicle and an associated implement in a manner that compresses and distributes crop material for ensilage.

BACKGROUND OF THE INVENTION

Various forage crops, such as grasses, alfalfa, oats, rye, maize, and/or the like, may be ensiled for later use as livestock fodder. In many instances, such forage crops are harvested and transported to a bunker, pad, or other storage location for ensilage. A tractor may be used to distribute a portion of the harvested crop material across the bunker or pad to form a layer of crop material. The layer may then be compressed, such as by driving the tractor across the layer, to remove at least a portion of the oxygen present within the layer. This process may be repeated several times to form subsequent layers of distributed and compressed crop material on top of the initial layer. Thereafter, the resulting heap of crop material may be wrapped in a plastic sheet for ensilage.

The nutritive content of the ensiled crop material is directly related to the amount oxygen removed during compression. Specifically, the nutritive content retained within the ensiled crop material is improved as the amount of oxygen removed during compression is increased. In this regard, tractor operators typically strive to distribute the crop material into thin layers and compress the entirety of each layer to maximize the amount of oxygen removed from the crop material. However, it may be difficult for tractor operators to monitor the thickness of each layer of the crop material. Furthermore, it may be difficult for tractor operators to ensure that the tractor has driven over the entirety of each layer.

Accordingly, an improved system and method for distributing and compressing crop material for ensilage would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a method for distributing crop material for ensilage. The method may include determining, with a computing device, a storage volume for the crop material. The method may also include dividing, with the computing device, the determined storage volume into a plurality of planes. Each plane of the plurality of planes may be spaced apart from each other plane of the plurality of planes along a vertical direction. Furthermore, the method may include controlling, with the computing device, an operation of at least one of a work vehicle or an associated implement in a manner that distributes a portion of the crop material on a given plane of the plurality of planes.

In another aspect, the present subject matter is directed to a system for distributing crop material for ensilage. The system may include a work vehicle and an implement coupled to the work vehicle, with the implement configured to distribute the crop material. The system may also include a controller configured to: determine a storage volume for the crop material and divide the determined storage volume into a plurality of planes. Each plane of the plurality of planes may be spaced apart from each other plane of the plurality of planes along a vertical direction. Furthermore, the controller may be configured to control an operation of at least one of the work vehicle or the implement in a manner that distributes a portion of the crop material on a given plane of the plurality of planes.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
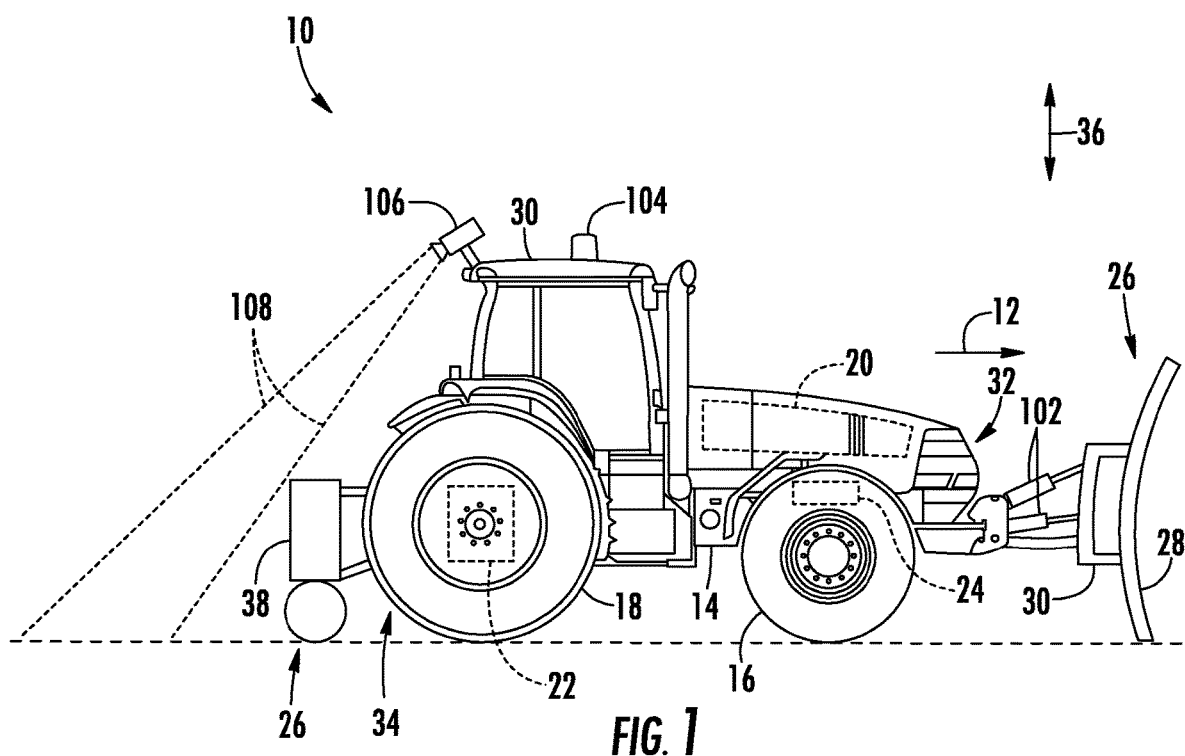
FIG. 1 illustrates a side view of one embodiment of a work vehicle configured to distribute and compress crop material for ensilage in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for distributing and compressing crop material for ensilage. Specifically, in several embodiments, a controller of the disclosed system may be configured to determine a storage volume for a quantity of harvested crop material. The storage volume may generally correspond to a desired size and shape of a silage heap for ensiling the quantity of harvested crop material. The controller may also be configured to divide the determined storage volume into a plurality of planes (e.g., horizontal or curved planes), with each plane being spaced apart from each other plane along a vertical direction. In this regard, the spacing between the planes may generally correspond to the desired thickness for each layer of crop material in the silage heap. Thereafter, the controller may be configured to control the operation of a work vehicle (e.g., an agricultural tractor) and/or an associated implement(s) (e.g., a blade mounted on the tractor) in a manner that distributes a portion of the harvested crop material on a first or lowermost plane to form a first layer of the silage heap. After the first layer has been formed, the controller may be configured to control the operation of the work vehicle and/or an associated implement(s) (e.g., a rolling ballast device) such that the work vehicle and/or implement travels across the first layer of crop material in a manner that compresses the crop material. For example, in one embodiment, the controller may be configured to monitor the crop material density of the first layer density as the work vehicle compresses the crop material. In this regard, the controller may be configured to control the operation of the work vehicle based on the monitored crop material density such that the work compresses the first layer to a predetermined crop material density. Thereafter, the process is repeated to distribute crop material on subsequent planes and compress the distributed crop to form subsequent layers of the silage heap.

Referring now to the drawings, FIG. 1 illustrates a side view of one embodiment of a work vehicle 10 in accordance with aspects of the present subject matter. In general, the work vehicle 10 may be configured to move across a top surface of a silage heap in a direction of travel (e.g., as indicated by arrow 12 in FIG. 1). In the illustrated embodiment, the work vehicle 10 is configured as an agricultural tractor. However, in other embodiments, the work vehicle 10 may be configured as any other suitable type of vehicle.

As shown in FIG. 1, the work vehicle 10 may include a frame or chassis 14 configured to support or couple to a plurality of components. For example, a pair of steerable front wheels 16 and a pair of driven rear wheels 18 may be coupled to the frame 14. The wheels 16, 18 may be configured to support the work vehicle 10 relative to the top surface of a silage heap and move the vehicle 10 in the direction of travel 12 across the silage heap. However, it should be appreciated that, in alternative embodiments, the front wheels 16 may be driven in addition to or in lieu of the rear wheels 18. Additionally, it should be appreciated that, in further embodiments, the work vehicle 10 may include track assemblies (not shown) in place of the front and/or rear wheels 16, 18.

Furthermore, the work vehicle 10 may include one or more devices for adjusting the speed and/or the direction of travel 12 at which the vehicle 10 moves across the silage heap. Specifically, in several embodiments, the work vehicle 10 may include an engine 20 and a transmission 22 mounted on the frame 14. In general, the engine 20 may be configured to generate power by combusting or otherwise burning a mixture of air and fuel. The transmission 22 may, in turn, be operably coupled to the engine 20 and may provide variably adjusted gear ratios for transferring the power generated by the engine 20 to power to the driven wheels 18. For example, increasing the power output by the engine 20 (e.g., by increasing the fuel flow to the engine 20) and/or shifting the transmission 22 into a higher gear may increase the speed at which the work vehicle 10 moves across the silage heap. Conversely, decreasing the power output by the engine 20 (e.g., by decreasing the fuel flow to the engine 20) and/or shifting the transmission 22 into a lower gear may decrease the speed at which the work vehicle 10 moves across the silage heap. Moreover, the work vehicle 10 may include a steering actuator 24 configured to adjust the orientation of the steerable wheels 16 relative to the frame 14 in a manner that adjusts the direction of travel 12 of the vehicle 10. For example, the steering actuator 24 may correspond to an electric motor, a linear actuator, a hydraulic cylinder, a pneumatic cylinder, or any other suitable actuator coupled to suitable mechanical assembly, such as a rack and pinion assembly or a worm gear assembly.

In several embodiments, the work vehicle 10 may include one or more implements 26 configured to push and/or compress a quantity of crop material across the silage heap in a manner that distributes the crop material. Specifically, in one embodiment, the implement(s) 26 may include a blade 28 and a mounting assembly 30 configured to adjustably couple the blade 28 to the frame 14 of the work vehicle 10. As will be described below, the mounting assembly 30 may permit the position and/or orientation of the blade 28 relative to the frame 14 of the work vehicle 10 to be adjusted. In the illustrated embodiment, the mounting assembly 30 is coupled to a forward end 32 of the frame 14. However, in alternative embodiments, the mounting assembly 30 may be coupled to any other suitable portion of the frame 14, such as an aft portion 34 of the frame 14. Additionally, it should be appreciated that the implement(s) 26 may correspond to any other suitable type of implement configured to push and/or compress the crop material across a silage heap, such as a bucket. For example, as shown, in one embodiment, the implement(s) 26 may include a weighted roller 38 or other ballast device(s) configured to compress the crop material. Furthermore, it should be appreciated that any other suitable number of implements 26 may be coupled to the work vehicle 10, such as one implement 26 or three or more implements 26.

Moreover, the work vehicle 10 may include one or more implement actuators 102. Specifically, each actuator 102 may be configured to adjust to the position or orientation of the implement(s) 26 (e.g., the blade 28 and/or the weighted roller 38) relative to the frame 14 of the work vehicle 10. For example, in one embodiment, a first end of each actuator 102 (e.g., a rod of each actuator 102) may be coupled to the mounting assembly 30, while a second end of each actuator 102 (e.g., the cylinder of each actuator 102) may be coupled to the work frame 14. The rod of each actuator 102 may be configured to extend and/or retract relative to the corresponding cylinder to adjust the position or orientation of the blade 28 relative to the work vehicle frame 14. In one embodiment, the actuator(s) 102 corresponds to a fluid-driven actuator(s), such as a hydraulic or pneumatic cylinder(s). However, it should be appreciated that the actuator(s) 102 may correspond to any other suitable type of actuator(s), such as an electric linear actuator(s). Additionally, although the embodiment shown in FIG. 1 includes two actuators 102, the work vehicle 10 may include any other suitable number of actuators 102, such as one actuator 102 or three or more actuators 102. Moreover, although not shown in FIG. 1, the work vehicle 10 may include additional actuator(s) 102 configured to adjust the position of the weighted roller 38.

Furthermore, it should be appreciated that the implement actuator(s) 102 may be configured to adjust the position and/or orientation of the implement(s) 26 in any suitable manner. For example, in several embodiments, one or more of the actuator(s) 102 may be configured to move the blade 28 along a vertical direction (e.g., as indicated by arrow 36 in FIG. 1) relative to the frame 14 of the work vehicle 10 in a manner that raises and lowers the blade 28. Furthermore, one or more of the actuator(s) 102 may be configured to adjust a fore/aft tilt angle of the blade 28. In general, the fore/aft tilt angle of the blade 28 may be the angle defined between the top surface of the silage heap and an axis (not shown) of the blade 28 extending from a top edge of the blade 28 to a bottom edge of the blade 28. Furthermore, one or more of the actuator(s) 102 may be configured to adjust a yaw angle of the blade 28. In general, the yaw angle of the blade 28 may be the angle defined between the top surface of the silage heap and an axis (not shown) of the blade 28 extending from a first side of the blade 28 to a second side of the blade 28. Additionally, one or more of the actuator(s) 102 may be configured to adjust a lateral tilt or side-to-side angle of the blade 28. In general, the lateral tilt angle of the blade 28 may be the angle defined between a lateral centerline (not shown) of the work vehicle 10 (with the lateral centerline extending perpendicular to the direction of travel 12) and an axis (not shown) of the blade 28 extending from a first lateral side of the blade 28 to a second lateral side of the blade 28. In one embodiment, one or more of the actuator(s) 102 may be configured to move the weighted roller 38 along the vertical direction 36 relative to the frame 14 of the work vehicle 10 in a manner that raises and lowers the roller 38. However, in other embodiments, the actuator(s) 102 may be configured to adjust the orientation and/or position of the implement(s) 26 in any other suitable manner.

Furthermore, it should be appreciated that the implement actuator(s) 102 may be positioned or installed on the work vehicle 10 and/or the implement(s) 26. For example, as shown in FIG. 1, the actuator(s) 102 are mounted are coupled between the work vehicle 10 and the mounting assembly 30. However, in other embodiments, the actuator(s) 102 may be positioned entirely on the implement(s) 26 (e.g., coupled between two portions of the mounting assembly 30) or entirely on the work vehicle 10 (e.g., the actuator(s) 102 corresponds to a hydraulic remote(s) or a power take-off unit (PTO) of the vehicle 10.

In accordance with aspects of the present subject matter, a location sensor 104 may be provided in operative association with the work vehicle 10. In general, the location sensor 104 may be configured to determine the exact location of one or more components of the work vehicle 10 (e.g., the wheels 16, 18) and/or the implement(s) 26 (e.g., the blade 28, and/or the weighted roller 38) using a satellite navigation positioning system (e.g. a GPS system, a Galileo positioning system, the Global Navigation satellite system (GLONASS), the BeiDou Satellite Navigation and Positioning system, and/or the like). In such an embodiment, the location determined by the location sensor 104 may be transmitted to a controller(s) of the work vehicle 10 (e.g., in the form coordinates) and stored within the controller's memory for subsequent processing and/or analysis. For instance, based on the known dimensional configuration and/or relative positioning between the location sensor 104 and the components of the work vehicle 10 or the implement(s) 26, the determined location from the location sensor 104 may be used to geo-locate such components of the work vehicle 10 and/or the implement 26 relative to the silage heap. It should be appreciated that determined coordinates may be three-dimensional coordinates (e.g., latitude, longitude, and height or position along the vertical direction 36).

Moreover, the work vehicle 10 may include a vision-based sensor 106 coupled thereto and/or supported thereon. In general, the vision-based sensor 106 may be configured to capture image data and and/or other vision-based data of the silage heap (e.g., of the top surface of the silage heap) across which the work vehicle 10 is traveling. Specifically, in several embodiments, the vision-based sensor 106 may be provided in operative association with the work vehicle 10 such that the vision-based sensor 106 has a field of view or sensor detection range (e.g., as indicated by dashed lines 108 in FIG. 1) directed towards a portion of the silage heap adjacent to the work vehicle 10. For example, as shown in FIG. 1, in one embodiment, the vision-based sensor 106 may be provided at the aft end 34 of the work vehicle 10 to allow the vision-based sensor 106 to capture vision-based data of a section of the silage heap disposed in behind of the vehicle 10. However, in alternative embodiments, the vision-based sensor 106 may be installed at any other suitable location on the work vehicle 10. For example, in one alternative embodiment, the vision-based sensor 106 may be provided at or adjacent to the forward end 32 of the work vehicle 10 to allow the vision-based sensor 106 to capture image data of a section of the silage heap disposed in front of the vehicle 10. Although the embodiment of the work vehicle 10 shown in FIG. 1 includes one vision-based sensor 106, it should be appreciated that the work vehicle 10 may include any other suitable number of vision-based sensors 106, such as two or more vision-based sensors 106.

Furthermore, it should be appreciated that the vision-based sensor 106 may correspond to any suitable sensing device(s) configured to detect or capture image data or other vision-based data (e.g., point cloud data) associated with the silage heap present within the associated field of view of the vision-based sensor 106. For example, in several embodiments, the vision-based sensor 106 may correspond to a suitable camera configured to capture images of the silage heap, such as three-dimensional images of the top surface of the silage heap present with in the associated field of view 108. For instance, in a particular embodiment, the vision-based sensor 106 may correspond to a stereographic camera having two or more lenses with a separate image sensor for each lens to allow the camera to capture stereographic or three-dimensional images. However, in alternative embodiments, the vision-based sensor 106 may correspond to Light Detection and Ranging (LIDAR) sensor or any other suitable vision-based sensing device(s). Additionally, other sensor(s), such as a Radio Detection and Ranging (RADAR) sensor(s) and/or an ultrasonic sensor(s), may be used to capture data of the silage heap (e.g., of the top surface of the silage heap) across which the work vehicle 10 is traveling.

Additionally, it should be appreciated that the configuration of the work vehicle 10 described above and shown in FIG. 1 is provided only to place the present subject matter in an exemplary field of use. Thus, it should be appreciated that the present subject matter may be readily adaptable to any manner of vehicle configuration.

Figure 2:
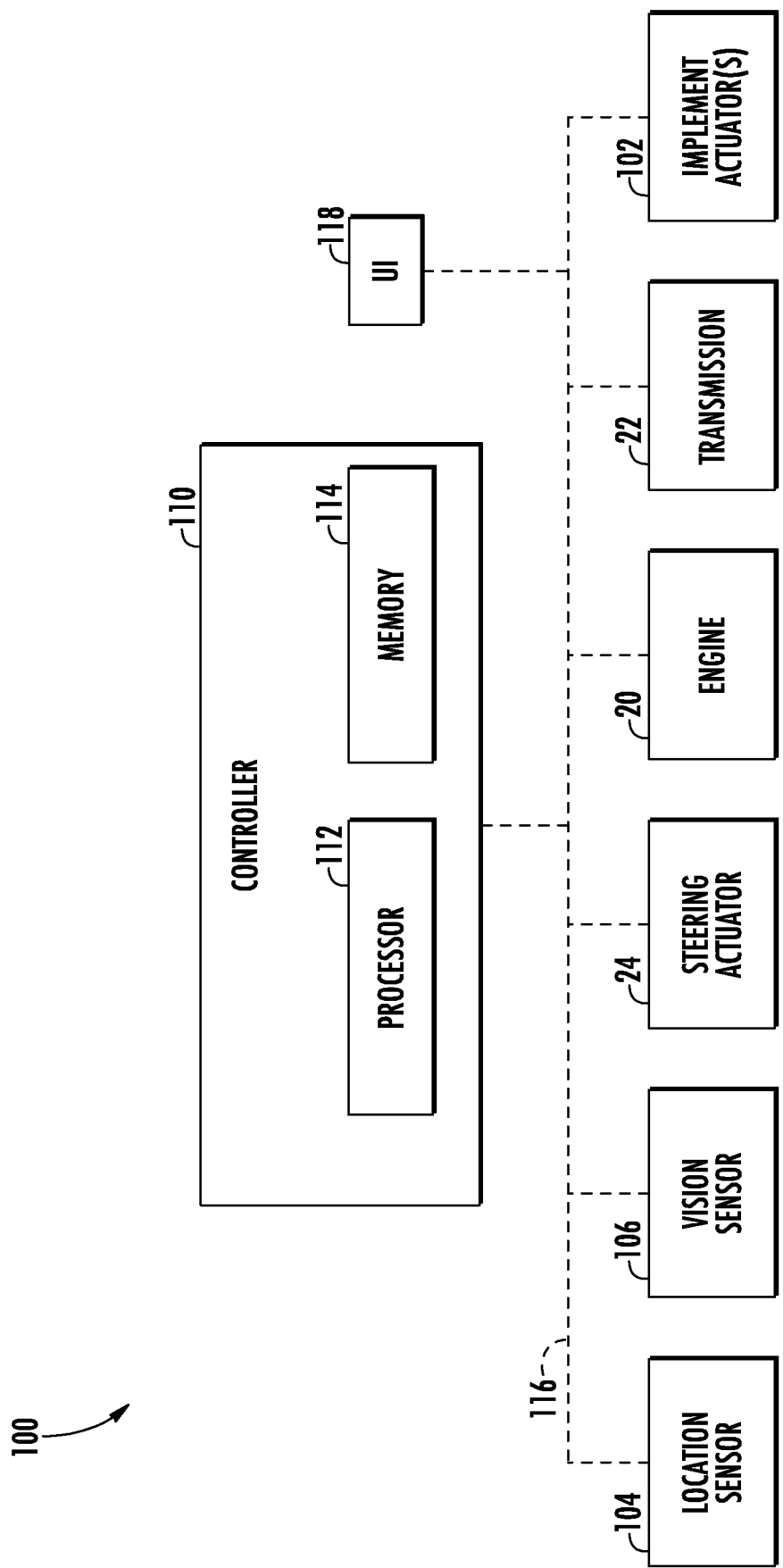
FIG. 2 illustrates a schematic view of one embodiment of a system for distributing and compressing crop material for ensilage in accordance with aspects of the present subject matter.

Referring now to FIG. 2, a schematic view of one embodiment of a system 100 for distributing and compressing crop material for ensilage is illustrated in accordance with aspects of the present subject matter. In general, the system 100 will be described herein with reference to the work vehicle 10 described above with reference to FIG. 1. However, it should be appreciated by those of ordinary skill in the art that the disclosed system 100 may generally be utilized with work vehicles having any other suitable vehicle configuration.

As shown in FIG. 2, the system 100 may include a controller 110 positioned on and/or within or otherwise associated with the work vehicle 10. In general, the controller 110 may comprise any suitable processor-based device known in the art, such as a computing device or any suitable combination of computing devices. Thus, in several embodiments, the controller 110 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 114 of the controller 110 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 114 may generally be configured to store suitable computer-readable instructions that, when implemented by the processor(s) 112, configure the controller 110 to perform various computer-implemented functions.

In addition, the controller 110 may also include various other suitable components, such as a communications circuit or module, a network interface, one or more input/output channels, a data/control bus and/or the like, to allow controller 110 to be communicatively coupled to any of the various other system components described herein (e.g., the engine 20, the transmission 22, the steering actuator 24, the implement actuator(s) 102, the location sensor 104, and/or the vision-based sensor 106). For instance, as shown in FIG. 2, a communicative link or interface 116 (e.g., a data bus) may be provided between the controller 110 and the components 20, 22, 24, 102, 104, 106 to allow the controller 110 to communicate with such components 20, 22, 24, 102, 104, 106 via any suitable communications protocol (e.g., CAN-BUS).

It should be appreciated that the controller 110 may correspond to an existing controller(s) of the work vehicle 10, itself, or the controller 110 may correspond to a separate processing device. For instance, in one embodiment, the controller 110 may form all or part of a separate plug-in module that may be installed in association with the work vehicle 10 to allow for the disclosed systems and methods to be implemented without requiring additional software to be uploaded onto existing control devices of the vehicle 10. It should also be appreciated that the functions of the controller 110 may be performed by a single processor-based device or may be distributed across any number of processor-based devices, in which instance such devices may be considered to form part of the controller 110. For instance, the functions of the controller 110 may be distributed across multiple application-specific controllers, such as an engine controller, a transmission controller, a steering controller, a navigation controller, and/or the like. In other embodiments, the controller 110 may be a remote controller, such as a "cloud-based" controller or a farm management office-based controller.

Furthermore, in one embodiment, the system 100 may also include a user interface 118. More specifically, the user interface 118 may be configured to receive inputs from the operator of the work vehicle 10. As such, the user interface 118 may include one or more input devices (not shown), such as touchscreens, keypads, touchpads, knobs, buttons, sliders, switches, mice, microphones, and/or the like, which are configured to receive user inputs from the operator. The user interface 118 may, in turn, be communicatively coupled to the controller 110 via the communicative link 116 to permit the operator inputs to be transmitted to the controller 110. In addition, some embodiments of the user interface 118 may include one or more feedback devices (not shown), such as display screens, speakers, warning lights, and/or the like, which are configured to provide feedback from the controller 110 to the operator. In one embodiment, the user interface 118 may be positioned within a cab of the work vehicle 10. However, in alternative embodiments, the user interface 118 may have any suitable configuration and/or be positioned in any other suitable location, such as at a remote location (e.g., a farm management office).

In several embodiments, the controller 110 may be configured to determine a storage volume for a quantity of harvested crop material. More specifically, crop material harvested from the field (e.g., by a forage harvester) may be delivered to a concrete pad, bunker, or other storage location for the ensiling process. As will be described below, the crop material may be distributed across the storage location in a plurality of vertically-stacked layers to form a silage heap. In general, the determined storage volume may be the preferred or ideal shape and size of the silage heap for the quantity of crop material to be ensiled such that the maximum amount of nutritive content is retained within the ensiled crop material. The determined storage volume may also be configured to facilitate ease of unpacking for feeding livestock. For example, as will be described below, the sides of the determined storage volume may have a particular slope to maintain the structural integrity of the silage heap during unpacking. As such, the controller 110 may be configured to receive parameters associated with the volume or quantity of harvested crops to be ensiled, the type and or condition of the harvested crops (e.g., the moisture content), and/or the space available for ensiling such harvested crops (e.g., the area of the pad, bunker, or other storage area on which the crops are to be ensiled). For example, in one embodiment, the controller 110 may be configured to receive the inputs or parameters from the operator. In such embodiment, the operator of the work vehicle 10 may provide the parameters to the user interface 118, such as via the one or more input devices. The parameters may, in turn, be transmitted from the user interface 118 to the controller 110 via the communicative link 116. Thereafter, the controller 110 may be configured to determine the storage volume for the quantity of harvested crops based on the received parameters. For instance, the controller 110 may include a look-up table(s), suitable mathematical formula, and/or algorithms stored within its memory 114 that correlates the received parameters to the storage volume.

In one embodiment, the controller 110 may be configured to parameters associated with the volume or quantity of harvested crop material to be ensiled and the space available for ensiling such harvested crop material based on received vision-based data. In this regard, the vision-based sensor 106 may be configured to capture vision-based data of the harvested crops to be ensiled and/or the space available for ensiling such harvested crops. The vision-based data may, in turn, be transmitted to the controller 110 via the communicative link 116. The controller 110 may be configured to analyze the vision-based data to determine the volume of the harvested crop material to be ensiled and the area of the space available for ensiling such harvested crop material. For example, the controller 110 may include one or more suitable algorithms stored within its memory 114 that, when executed, configure the controller 110 to analyze the received vision-based data such that the volume of the harvested crop material to be ensiled and the area of the space available for ensiling such crop material may be determined.

Furthermore, the controller 110 may be configured to divide the determined storage volume into a plurality of planes. In general, each plane may be spaced apart from each other plane along the vertical direction 36. As indicated above, the harvested crop material may be distributed across the storage location in a plurality of vertically-stacked layers when forming the silage heap. As such, in several embodiments, the spacing between the planes may generally correspond to a desired thickness for each layer of crop material in the silage heap. In one embodiment, the spacing between the planes may correspond to an uncompressed or partially compressed thickness for each layer of crop material (e.g., the thickness of each layer before compression by the work vehicle 10). In this regard, and as will be described below, each layer of distributed crop material may be positioned vertically between a pair of adjacent planes. For example, the controller 110 may include one or more suitable algorithms stored within its memory 114 that, when executed, configure the controller 110 to divide the determined storage volume into a plurality of planes.

Figure 3:
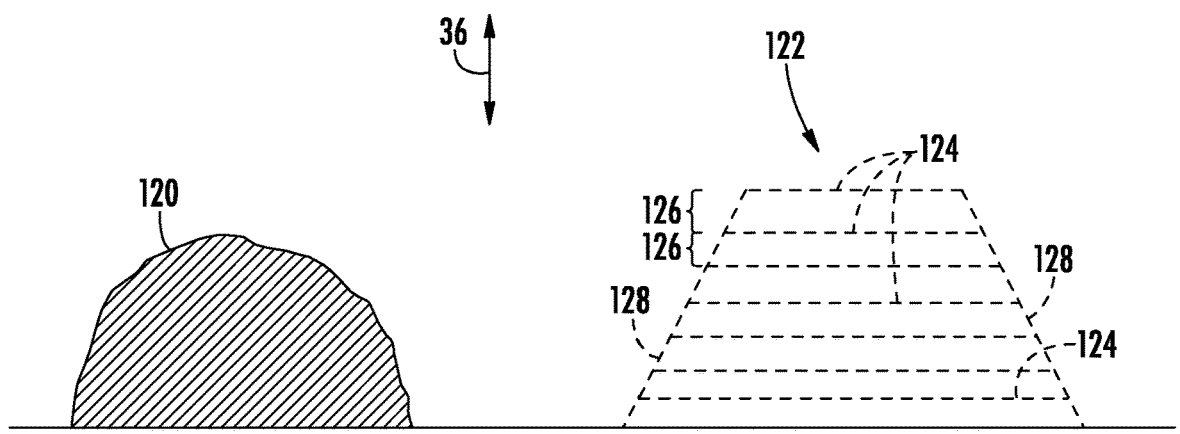
FIG. 3 illustrates a diagrammatic view of an example storage volume defined for a quantity of crop material to be ensiled in accordance with aspects of the present subject matter.
Figure 4:
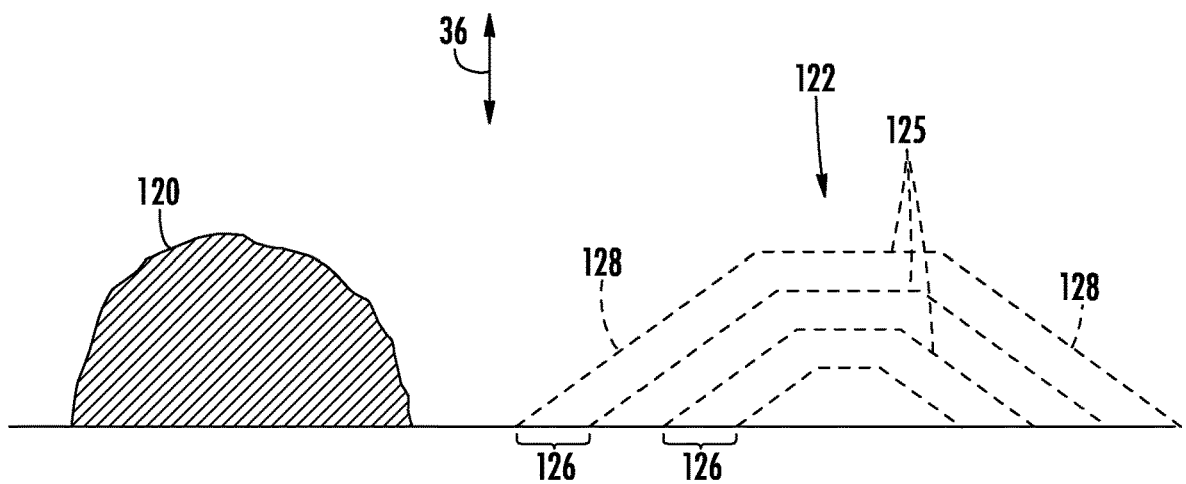
FIG. 4 illustrates a diagrammatic view of another example storage volume defined for a quantity of crop material to be ensiled in accordance with aspects of the present subject matter.
Figure 5:
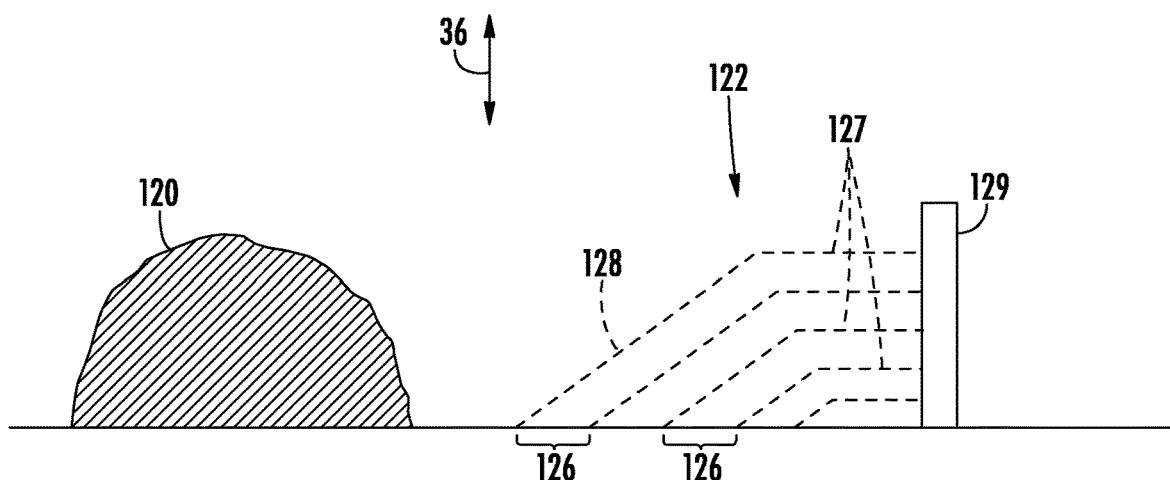
FIG. 5 illustrates a diagrammatic view of a further example storage volume defined for a quantity of crop material to be ensiled in accordance with aspects of the present subject matter.

Referring now to FIG. 3, a diagrammatic view of an example storage volume for a quantity of crop material to be ensiled is illustrated in accordance with aspects of the present subject matter. As shown, a quantity of harvested material 120 has been delivered to a storage location for the ensilage process. In this regard, the operator may provide the volume or quantity of the harvested material 120 and the size or area of the storage location to the controller 110 via the user interface 118. The controller 110 may be configured to determine a storage volume 122 for the harvested material 120 based on the volume or quantity of the harvested material 120 and the size or area of the storage location. Thereafter, the controller 110 may be configured to divide the determined storage volume 122 into a plurality of vertically spaced apart horizontal planes 124. As indicated above, the space between each pair of adjacent horizontal planes 124 along the vertical direction 36 may generally correspond to a layer 126 of crop material 120 within the silage heap. Furthermore, as shown in FIG. 4, in another embodiment, the controller 110 may be configured to divide the determined storage volume 122 into a plurality of vertically spaced apart curved planes 125, such as when ensiling the crops 120 on a pad. As shown, each plane 125 may generally include outer angled portions and a central horizontal portion. Additionally, as shown in FIG. 5, in a further embodiment, the controller 110 may be configured to divide the determined storage volume 122 into a plurality of vertically spaced apart curved planes 127, such as when ensiling the crops 120 in a bunker (e.g., against a wall 129 of the bunker). As shown, each plane 127 may generally include an angled portion and a horizontal portion that extends from the angled portion to the wall 129. However, the plurality of planes may have any other suitable shape.

It should be appreciated that, as shown in FIGS. 3-5, the determined storage volume 122 may include inwardly angled or tapered sides 128. Such a configuration may be necessary to maintain the structural integrity of the silage heap, particularly when the work vehicle 10 is positioned close to sides of the silage heap and/or when unpacking silage. In this regard, the controller 110 may be configured to determine the storage volume 122 for the crop material 120 such that the determined storage volume 122 has inwardly angled sides 128 to maintain the structural integrity of the silage heap. For example, the slope or angle of the sides 128 may correspond to a value(s) provided by the United States Department of Agriculture (USDA) or the applicable state agricultural extension office for the type and condition (e.g., the moisture content, length of cut, and/or the like) of the harvested crops being ensiled. In one embodiment, the maximum angle of the silage heap may be a predetermined value stored within the controller's memory 114. However, in alternative embodiments, the tractor operator may provide the maximum side angle for the silage heap to the controller 110 via the user interface 118.

Referring again to FIG. 3, the controller 110 may be configured to control the operation of the work vehicle 10 and/or the associated implement(s) 26 in a manner that distributes the harvested crop material on each of the planes of the determined storage volume. As indicated above, the storage volume is divided into a plurality of vertically spaced apart planes, with the space between each pair of adjacent planes corresponding to a layer of crop material within silage heap. In this regard, the controller 110 may be configured to control the operation of the work vehicle 10 and/or the associated implement(s) 26 in a manner that distributes a portion of the crop material on a first or lowermost plane of the storage volume. As will be described below, the controller 110 may be configured to control the operation of work vehicle 10 in a manner that compresses the crop material distributed across the lowermost plane of the storage volume. Thereafter, the controller 110 may be configured to control the operation of the work vehicle 10 and/or the associated implement(s) 26 in a manner that distributes portions of the crop material on each subsequent plane of the storage volume.

It should be appreciated that the controller 110 may be configured to control the operation of any suitable component(s) of the work vehicle 10 and/or the implement(s) 26 such that the crop material is distributed across each of the planes. As mentioned above, the controller 110 may be communicatively coupled to one or more components of the work vehicle 10 (e.g., the steering actuator 24, the engine 20, and/or the transmission 22) and/or one or more components of the implement(s) 26 (e.g., the implement actuator(s) 102) via the communicative link 116. In this regard, the communicative link 116 may permit the controller 110 to transmit control signals to such components. For example, the controller 110 may be configured to control the operation of the steering actuator 24 of the work vehicle 10 in a manner that controls the direction of travel 12 of the vehicle 10 such that the vehicle 10 traverses each plane of the storage volume. Additionally, in one embodiment, the controller 110 may be configured to control the operation of the engine 20 and/or the transmission 22 of the work vehicle 10 in a manner that controls the speed of the vehicle 10 as the vehicle 10 traverses each plane of the storage volume. Furthermore, the controller 110 may be configured to control the operation of the implement actuator(s) 102 of the implement(s) 26 in a manner that adjusts the position and/or orientation of the implement(s) 26 such that the crop material is distributed across each of the planes. However, in alternative embodiments, the controller 110 may be configured to control any other suitable component(s) of the work vehicle 10 and/or the implement(s) 26 in a manner that distributes the crop material.

In several embodiments, the controller 110 may be configured to control the operation of the work vehicle 10 and/or the implement(s) 26 in a manner that distributes the crop material on the planes storage volume such that the portion of the crop material on each plane defines a predetermined height or thickness. For example, in one embodiment, the predetermined thickness may correspond to the thickness of a layer of the crop material within the silage heap and, more particularly, to the thickness of an uncompressed or partially compressed layer of crop material within the silage heap. As such, the predetermined thickness may correspond to the distance along the vertical direction 36 between a given plane on which the crop material is being distributed and the subsequent plane positioned directly above the given plane. In this regard, the controller 110 may be configured to control the operation of the steering actuator 24, the engine 20, the transmission 22, and/or the implement actuator(s) 102 such that the crop material on each plane has the predetermined thickness.

Furthermore, the controller 110 may be configured to determine the current height of the top surface of the crop material being distributed across each plane. As used herein, the "height" of a plane or a surface of crop material generally corresponds to the position of such plane or surface along the vertical direction 36 relative to a surface of the storage location (e.g., a top surface of a pad or bunker on which the silage heap is formed). In this regard, as the work vehicle 10 traverses each plane of the storage volume when forming the silage heap, the controller 110 may be configured to receive location data (e.g., coordinates) from the location sensor 104 (e.g., via the communicative link 116). Thereafter, based on the known dimensional configuration and/or relative positioning between the location sensor 104 and a portion of a work vehicle or an implement component (e.g., the bottom edge of the blade 28 or the bottom surface of the wheels 16, 18) that is indicative of the position of the top surface of the crop material being distributed, the controller 110 may be configured to determine the height or position of the top surface of such crop material relative to the top surface of the storage location on which the silage heap is being formed.

Additionally, the controller 110 may be configured to control the operation of the work vehicle 10 and/or the implement(s) 26 when distributing the crop material across each plane based on the current height of such crop material. As indicated above, in several embodiments, the crop material may be distributed across each plane such that the crop material defines a predetermined thickness on each plane. As such, in one embodiment, the controller 110 may be configured to compare the determined height of the top surface of the crop material on a given plane to the determined height of the top surface of the crop material on the preceding plane (i.e., the plane positioned directly below the given plane) to determine the thickness of the distributed crop material. Alternatively, the controller 110 may be configured to compare the determined height of the top surface of the crop material on the given plane to the position of the given plane to determine the thickness of the distributed crop material. In another embodiment, the controller 110 may be configured to compare the determined height of the top surface of the crop material on the given plane to the position of a subsequent plane directly above the given plane along the vertical direction 36 to determine the thickness of the distributed crop material. When the current thickness of the crop material being distributed on the given plane is less than the predetermined thickness (thereby indicating that the layer of crop material is too thin), the controller 110 may be configured to control the operation of the work vehicle 10 and/or implement(s) 26 in a manner that increases the current thickness of the crop material on the given plane. For example, in such instance, the controller 110 may be configured to control the operation of the work vehicle 10 and/or the implement(s) 26 in a manner that adds crop material to location(s) on the given plane at which the current thickness falls below the predetermined thickness. Conversely, when the current thickness of the crop material being distributed on the given plane is greater than the predetermined thickness (thereby indicating that the layer of crop material is too thick), the controller 110 may be configured to control the operation of the work vehicle 10 and/or implement(s) 26 in a manner that decreases the current thickness of the crop material on the given plane. For example, in such instance, the controller 110 may be configured to control the operation of the work vehicle 10 and/or the implement(s) 26 in a manner that moves a portion the crop material from the location(s) on the given plane at which the current thickness exceeds the predetermined thickness to a location(s) on the given plane at which the current thickness falls below the predetermined thickness.

Figure 6:
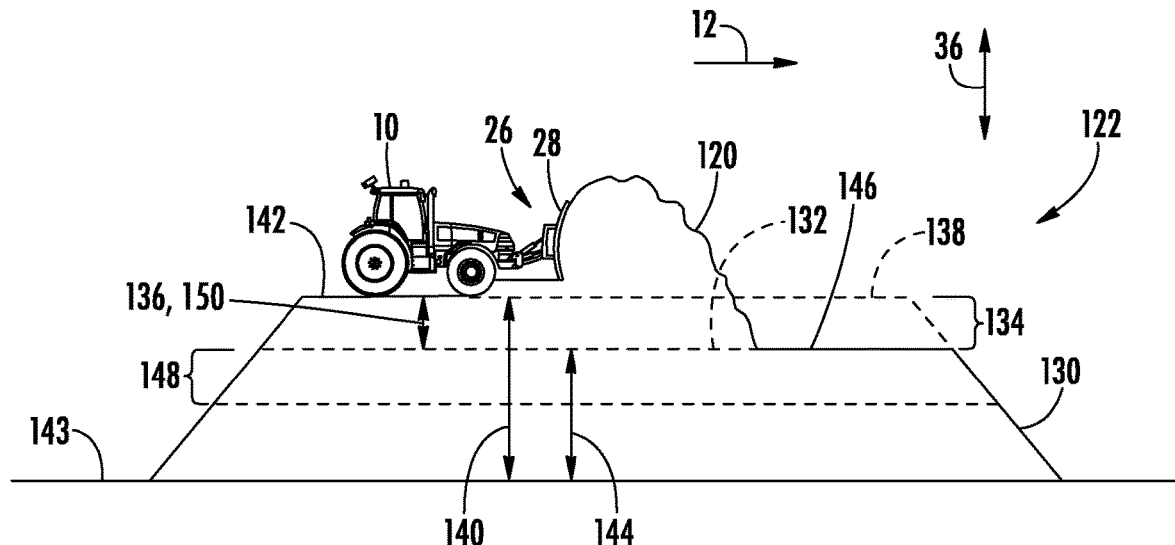
FIG. 6 illustrates a diagrammatic view of an example silage heap in accordance with aspects of the present subject matter, particularly illustrating a work vehicle distributing crop material to form a given layer within the silage heap.

Referring now to FIG. 6, a diagrammatic view of an example silage heap 130 is illustrated in accordance with aspects of the present subject matter. As shown, the work vehicle 10 is traveling across the top surface of the silage heap 130 in the direction of travel 12. In this regard, the blade 28 is being used to distribute a portion of the crop material 120 on a plane 132 of the determined storage volume 122 to form a top layer 134 of the silage heap 130. More specifically, the crop material 120 is being distributed on the plane 132 such that the top layer 134 defines a predetermined thickness (e.g., as indicated by arrow 136 in FIG. 6). As shown, the predetermined thickness 136 corresponds to the distance between the plane 132 and a subsequent plane 138 positioned directly above the plane 132 along the vertical direction 36. As such, the controller 110 may be configured to determine a current height (e.g., as indicated by arrow 140 in FIG. 6) of a top surface 142 of the distributed crop material 120 relative to a storage location 143 on which the crop material 120 is being ensiled based on coordinates or other location data received from the location sensor 104. The controller 110 may then be configured to compare the determined height 140 of the top surface 142 to a height (e.g., as indicated by arrow 144 in FIG. 6) of the plane 132 and/or a top surface 146 of a preceding layer 148 of the crop material 120 to determine the current thickness (e.g., as indicated by arrow 150 in FIG. 6) of the top layer 134. As shown in FIG. 6, the current thickness 150 of the given layer 134 generally corresponds to the predetermined thickness 136. However, when the current thickness 150 differs from the predetermined thickness 136, the controller 110 may be configured to control the operation of the work vehicle 10 and/or the implement(s) 26 in a manner that adjust the current thickness 150 of the top layer 134. It should be appreciated that, as shown in FIG. 6, the distributed layer of crop material may be partially compressed (e.g., by the wheels of the work vehicle 10) during distribution.

In one embodiment, the controller 110 may be configured to control the operation of the work vehicle 10 and/or the implement(s) 26 when distributing the crop material across each plane based on one or more gradient vectors associated with the crop material being distributed. In general, the gradient vector(s) may be indicative of how the crop material is distributed along a given plane. As such, the gradient vector(s) may identify high spots, low spots, and/or the slope of the crop material on the given plane. Specifically, in such embodiment, the controller 110 may be configured to identify or otherwise determine a plurality of measurement points on each plane. As the work vehicle 10 is traveling across each plane, the controller 110 may be configured to determine the current height of the crop material at each measurement point based on coordinates or other location data received from the location sensor 104. The controller 110 may then be configured to calculate or otherwise determine a gradient vector associated with the distributed crop material at each measurement point. In this regard, for a given measurement point, the controller 110 may be configured to calculate the associated gradient vector based on the height of the crop material at the measurement point and the height(s) of the crop material at one or more adjacent measurement points. For instance, the controller 110 may include a look-up table(s), suitable mathematical formula, and/or algorithms stored within its memory 114 that correlates the determined heights to the associated gradient vector. Thereafter, the controller 110 may be configured to control to control the operation of the steering actuator 24, the engine 20, the transmission 22, and/or the implement actuator(s) 102 based on the determined gradient vector(s) such that the crop material distributed on each plane has the predetermined thickness.

Moreover, in one embodiment, the controller 110 may be configured to control the operation of the work vehicle 10 and/or the implement(s) 26 when distributing the crop material across each plane based on the roughness of the top surface of the distributed crop material. More specifically, it is generally desirable that the roughness of the top surface of each layer of the silage heap be minimized to facilitate maximum compression of each layer. In this regard, as the work vehicle 10 travels across the silage heap, the vision-based sensor 106 may be configured to capture vision-based data of the top surface of the silage heap. The vision-based data may, in turn, be transmitted to the controller 110 via the communicative link 116. The controller 110 may be configured to analyze the vision-based data to determine the surface roughness of the distributed crop material within the field of view 108 of the vision-based sensor 106. For example, the controller 110 may include one or more suitable algorithms stored within its memory 114 that, when executed, configure the controller 110 to analyze the received vision-based data such that the surface roughness of the distributed crop material may be determined. Furthermore, the controller may be configured to compare the determined surface roughness of the distributed crop material to a predetermined surface roughness value or standard. Thereafter, when the determined surface roughness differs from the predetermined surface roughness value or standard (thereby indicating that the top surface of the distributed crop material is too rough), the controller 110 may be configured to control the operation of the work vehicle 10 and/or the implement(s) 26 such that the crop material is distributed in a manner that reduces its surface roughness.

Referring again to FIG. 3, the controller 110 may be configured to control the operation of the work vehicle 10 in a manner that compresses each layer distributed crop material within the silage heap. As indicated above, a quantity of harvested crop material may be distributed across a storage location in a plurality of vertically stacked layers to form a silage heap. After each layer is formed, it may generally be desirable to compress the crop material for each layer to remove as much oxygen as possible from the crop material such that the maximum amount of nutritive content is retained within the crop material during the ensiling process. In several embodiments, each layer of the silage heap may be compressed by the work vehicle 10 and, more particularly, by the wheels 16, 18 of the vehicle 10. For example, in one embodiment, the controller 110 may be configured to control the operation of the engine 20, the transmission 22, the steering actuator 24, and/or implement actuator(s) 102 of the work vehicle 10 such that at least one of the wheels 16, 18 or the weighted roller 38 rolls across each portion of the crop material on a first or lowermost layer of the silage heap. As described above, once the lowermost layer has been compressed, crop material may be distributed on top of the compressed lowermost layer of crop material to form a subsequent layer of crop material. Thereafter, the controller 110 may be configured to control the operation of the work vehicle 10 in a manner that compresses the subsequent layer of crop material. The remainder of the silage heap may be formed by distributing and compressing additional layers of crop material.

In several embodiments, the controller 110 may be configured to control the operation of the work vehicle 10 when compressing the crop material within each layer of the silage heap based on the current location of the vehicle 10. More specifically, as the work vehicle 10 traverses each layer of the silage heap when compressing the crop material, the controller 110 may be configured to receive location data (e.g., coordinates) from the location sensor 104 (e.g., via the communicative link 116). Based on the known dimensional configuration and/or relative positioning between the location sensor 104 and the bottom surfaces of the wheels 16, 18 and/or the weighted roller 38, the controller 110 may be configured to determine the locations of each layer of the silage heap over which the wheels 16, 18 and/or the weighted roller 38 have rolled. The controller 110 may then be configured to store the determined locations within its memory 114. Thereafter, for each layer of the silage heap, the controller 110 may be configured to tag or otherwise mark the locations occupied by such layer over which the wheels 16, 18 and/or the weighted roller 38 have rolled. For example, in one embodiment, the controller 110 may be configured to determine the locations occupied by each layer of the silage heap based on the locations occupied by the plane on which the crop material was distributed to form the layer. Thereafter, the controller 110 may be configured to control the operation of the work vehicle 10 and, more particularly, the steering actuator 24 and/or the weighted roller 38 such that all of the locations occupied by each layer of the silage heap are compressed by the wheels 16, 18. Additionally, in one embodiment, the controller 110 may be configured to control the direction of travel 12 of the work vehicle 10 as the vehicle 10 is compressing each layer of the silage heap in a manner that prevents the vehicle 10 from traveling parallel to and in close proximity of (e.g., within less than 5 feet) of an edge of the silage heap.

Furthermore, the controller 110 may be configured to control the operation of the work vehicle 10 when compressing the crop material within each layer of the silage heap based on the current density of the crop material. Specifically, in one embodiment, the controller 110 may be configured to control the operation of the work vehicle 10 such that each layer of the crop material has a predetermined density. For example, the predetermined density may correspond to a crop material density at which the crop material has been sufficiently compressed such a desired amount of oxygen has been removed from such crop material. In this regard, the controller 110 may be configured to control the operation of the steering actuator 24, the engine 20, the transmission 22, and/or implement actuator(s) 102 such that the crop material within each layer of the silage heap has the predetermined density.

In several embodiments, the controller 110 may be configured to determine the current density of the crop material based on the height of such crop material. As described above, the controller 110 may be configured to determine the height of the top surface of the crop material being traversed by the work vehicle 10 based on coordinates or other location data received from the location sensor 104. As such, in one embodiment, the controller 110 may be configured to compare the determined height of the top surface of the crop material forming a given layer of the silage heap to the determined height of the top surface of the crop material forming the preceding layer of the silage heap (i.e., the layer positioned directly below the given layer) to determine the crop material density of the given layer. Alternatively, the controller 110 may be configured to compare the determined height of the top surface of the crop material forming the top layer to the height of the plane on which the layer is formed to determine the crop material density of the given layer. In a further embodiment, the controller 110 may be configured to determine the crop material density of the given layer based one or more of a first height of the layer detected before the work vehicle 10 traverses the layer, a second height of the layer detected when the work vehicle 10 is traversing the layer, and a third height of the layer detected after the work vehicle 10 has traversed the layer. When the current density of the crop material being compressed within the top layer is less than the predetermined density (thereby indicating that too much oxygen is present within the given layer), the controller 110 may be configured to control the operation of the work vehicle 10 in a manner that increases the current crop material density of the given layer. For example, in such instances, the controller 110 may be configured to control the operation of the steering actuator 24 and/or the implement actuator(s) 102 such that the wheels 16, 18 and/or the weighted roller 38 of the work vehicle 10 roll over the portion(s) of the given layer at which the current density falls below the predetermined density.

Figure 7:
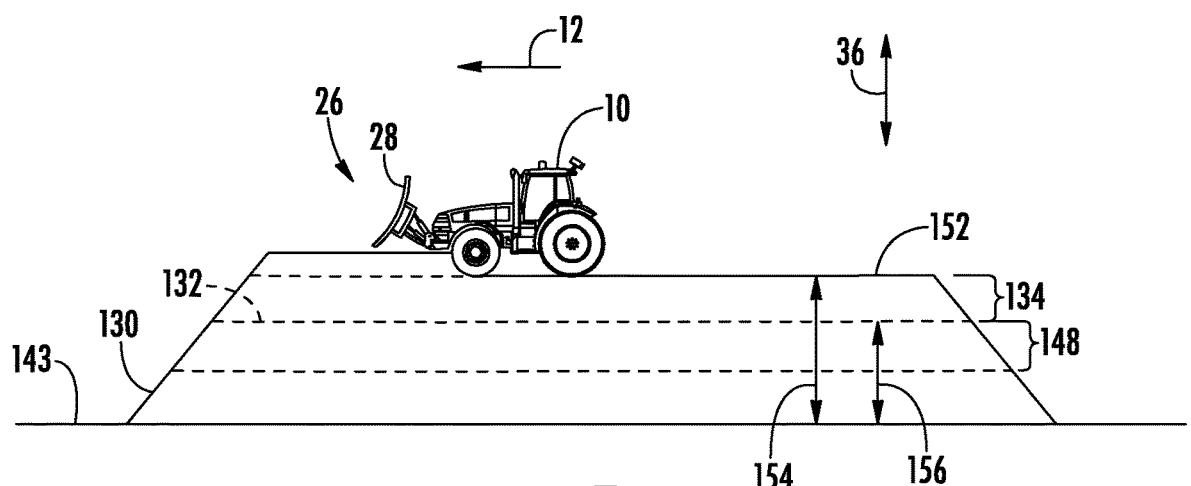
FIG. 7 illustrates a diagrammatic view of another example silage heap in accordance with aspects of the present subject matter, particularly illustrating a work vehicle compressing crop material forming a given layer within the silage heap.

Referring now to FIG. 7, a diagrammatic view of another example silage heap 130 is illustrated in accordance with aspects of the present subject matter. As shown, the work vehicle 10 is traveling across a top surface 152 of the silage heap 130 in the direction of travel 12. In this regard, the wheels 16, 18 and the weighted roller 38 (not shown) are being used to compress the crop material 120 forming the top layer 134 of the silage heap 130. More specifically, the crop material 120 within the top layer 134 is being compressed such that the layer 134 has a predetermined crop material density. As such, the controller 110 may be configured to determine a current height (e.g., as indicated by arrow 154 in FIG. 7) of the top surface 152 of the compressed crop material 120 relative to the pad or bunker 143 on which the crop material 120 is being ensiled based on coordinates or other location data received from the location sensor 104. The controller 110 may then be configured to compare the determined height 154 of the top surface 152 to a height (e.g., as indicated by arrow 156 in FIG. 7) of the plane 132 on which the top layer 134 is formed and/or a top surface of the preceding layer 148 of the crop material 120 to determine the current crop material density of the layer 134. When the current density is less than the predetermined density, the controller 110 may be configured to control the operation of the work vehicle 10 in a manner that increases the density of the given layer 134.

In one embodiment, the controller 110 may be configured to determine the current density of the crop material based on captured vision-based data of such crop material. More specifically, as the work vehicle 10 travels across each layer of the silage heap to compress the crop material therein, the vision-based sensor 106 may be configured to capture vision-based data of the top surface of the layer. The vision-based data may, in turn, be transmitted to the controller 110 via the communicative link 116. The controller 110 may be configured to analyze the vision-based data to determine the density of the compressed crop material within the field of view 108 of the vision-based sensor 106. For example, in one embodiment, the controller 110 may be configured to identify ridges on the top surface of the crop material that are oriented generally parallel to the direction of travel 12. In such instance, the wheels 16, 18 and/or the weighted roller 38 may not have rolled over the ridges or the ridges may not have been sufficiently compressed by the wheels 16, 18 and/or the weighted roller 38 due to the contour of the wheels 16, 18 and/or the weighted roller 38. The controller 110 may then be configured to the determine the current density of the crop material based on the height and length of the ridges. Alternatively, the controller 110 may control the operation of the work vehicle 10 such that the wheels 16, 18 and/or the weighted roller 38 roll over the identified ridges without regard to the density of the crop material. For instance, the controller 110 may include one or more suitable algorithms stored within its memory 114 that, when executed, configure the controller 110 to analyze the received vision-based data such that the density of the compressed crop material may be determined.

It should be appreciated that the controller 110 may determine the density of the crop material based on vision-based data in addition to or in lieu of location-based data. For example, in certain instances, the resolution of the coordinates received from the location sensor 104 may be insufficient to determine that the entirety of each layer of crop material has been compressed. In such instances, the vison-based data may be used to confirm that the entirety of each layer of crop material has been compressed.

Moreover, in one embodiment, the controller 110 may be configured to control the operation of the work vehicle 10 and/or the implement(s) 26 when compressing the crop material within each layer based on the roughness of the top surface of the compressed crop material. More specifically, it is generally desirable that the roughness of the top surface of each compressed layer of the silage heap be minimized to facilitate distribution of the crop material when forming the subsequent layer. As described above, as the work vehicle 10 travels across each layer of the silage heap, the controller 110 may be configured to receive vision-based data of the top surface of the layer from the vision-based sensor 106. The controller 110 may be configured to analyze the vision-based data to determine the surface roughness of the compressed crop material within the field of view 108 of the vision-based sensor 106. For example, the controller 110 may include one or more suitable algorithms stored within its memory 114 that, when executed, configure the controller 110 to analyze the received vision-based data such that the surface roughness of the compressed crop material may be determined. Furthermore, the controller may be configured to compare the determined surface roughness of the compressed crop material to a predetermined surface roughness value or standard. Thereafter, when the determined surface roughness differs from the predetermined surface roughness value or standard (thereby indicating that the top surface of the compressed crop material is too rough), the controller 110 may be configured to control the operation of the work vehicle 10 and/or the implement(s) 26 such that the crop material is compressed in a manner that reduces its surface roughness.

Additionally, in one embodiment, the controller 110 may be configured to initiate the application of one or more additives to the crop material when distributing and/or compressing such crop material. For example, the additives may reduce the oxygen content within crop material (in addition to the compression) to improve nutritive content retention. Furthermore, the additives may also stimulate lactic acid bacteria growth to assist in preserving the ensiled crop material. As such, the additives may include any suitable additive substances, such as bacterial inoculates, sugars, enzymes, propionates, non-protein nitrogen, acids, and/or the like. In such embodiment, the controller 110 may be configured to control the operation of one or more components of the work vehicle 10 (e.g., a suitable valve(s), pump(s), and/or the like) in a manner that dispenses or otherwise applies the additives to the crop material within the silage heap as the work vehicle 10 travels across the silage heap.

Figure 8:
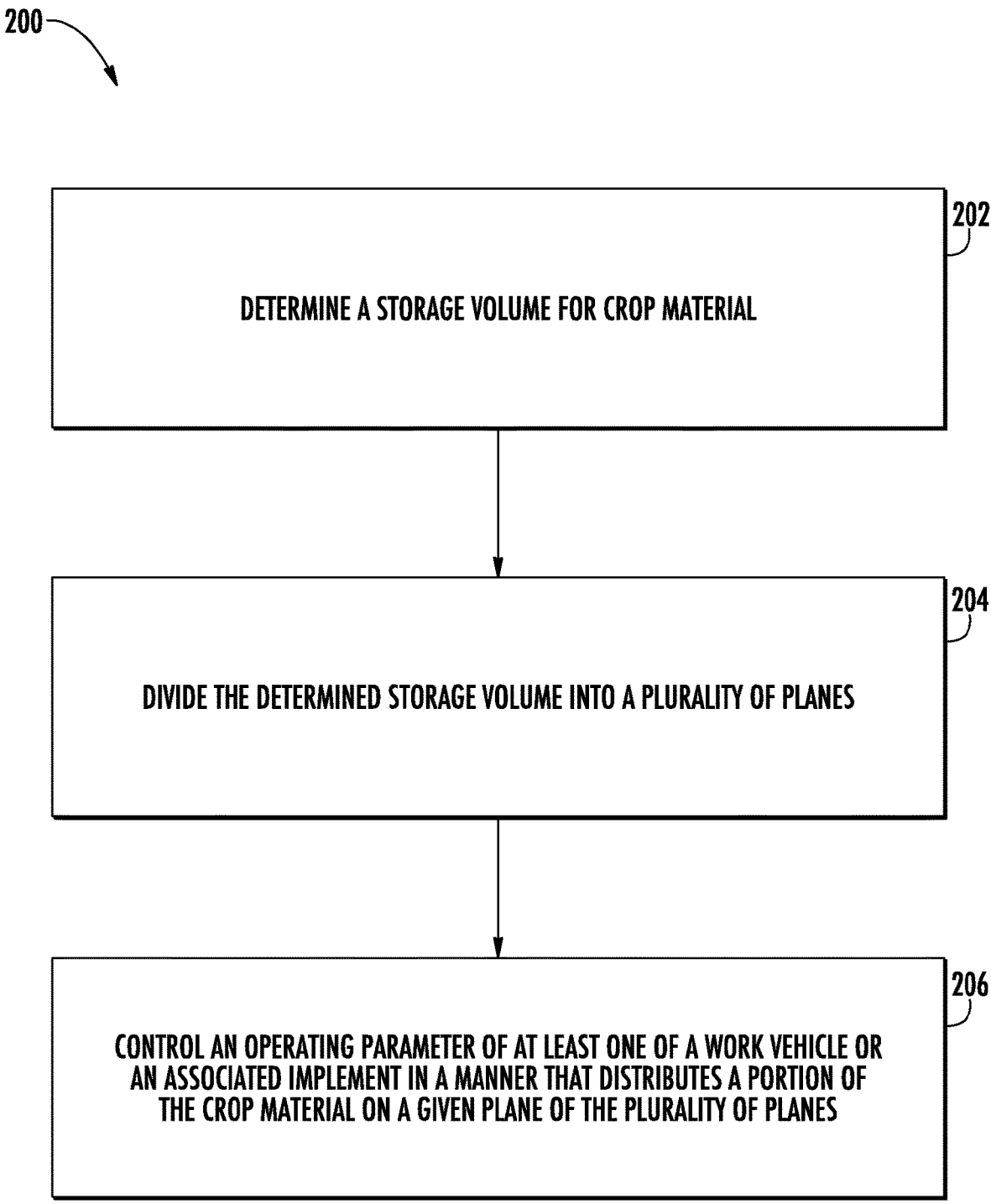
FIG. 8 illustrates a flow diagram of one embodiment of a method for distributing crop material for ensilage in accordance with aspects of the present subject matter.

Referring now to FIG. 8, a flow diagram of one embodiment of a method 200 for distributing crop material for ensilage is illustrated in accordance with aspects of the present subject matter. In general, the method 200 will be described herein with reference to the work vehicle 10 and the system 100 described above with reference to FIGS. 1-7. However, it should be appreciated by those of ordinary skill in the art that the disclosed method 200 may generally be implemented with any work vehicle having any suitable vehicle configuration and/or any suitable system having any suitable system configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 8, at (202), the method 200 may include determining, with a computing device, a storage volume for crop material. For instance, as described above, the controller 110 may be configured to determine a storage volume for a quantity of harvested crop material, such as based on inputs received from the operator.

Additionally, at (204), the method 200 may include dividing, with the computing device, the determined storage volume into a plurality of planes. For instance, as described above, the controller 110 may be configured to divide the determined storage volume into a plurality planes, with each plane being spaced apart from the other planes.

Moreover, as shown in FIG. 8, at (206), the method 200 may include controlling, with the computing device, an operation of at least one of a work vehicle or an associated implement in a manner that distributes a portion of the crop material on a given plane of the plurality of planes. For instance, as described above, the controller 110 may be configured to control the operation of the work vehicle 10, such as the operation of the engine 20, the transmission 22, the steering actuator 24, and/or the implement actuator(s) 102, in a manner that distributes a portion of the crop material along a given plane.

Figure 9:
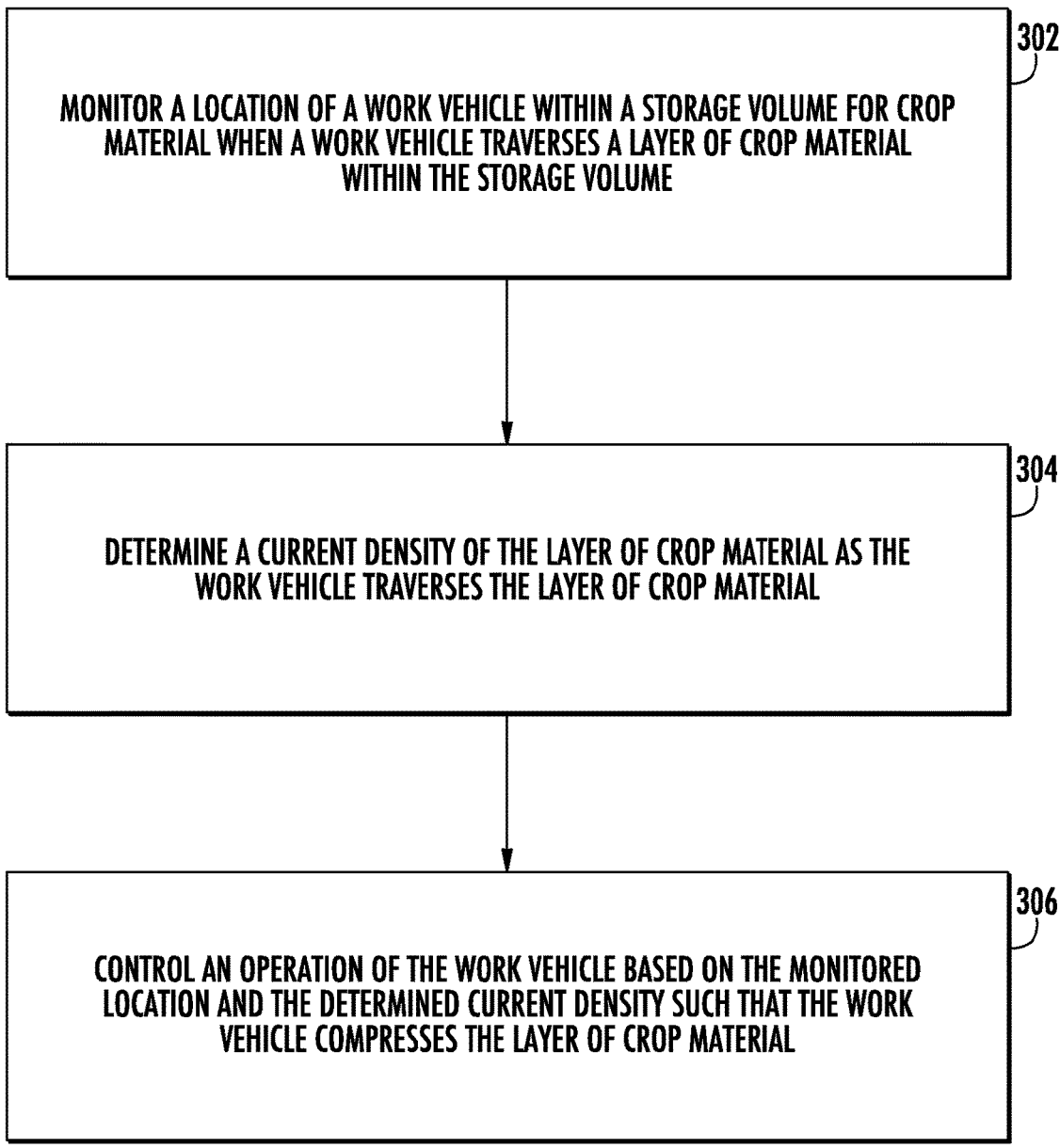
FIG. 9 illustrates a flow diagram of one embodiment of a method for compressing crop material for ensilage in accordance with aspects of the present subject matter.

Referring now to FIG. 9, a flow diagram of one embodiment of a method 300 for compressing crop material for ensilage is illustrated in accordance with aspects of the present subject matter. In general, the method 300 will be described herein with reference to the work vehicle 10 and the system 100 described above with reference to FIGS. 1-7. However, it should be appreciated by those of ordinary skill in the art that the disclosed method 300 may generally be implemented with any work vehicle having any suitable vehicle configuration and/or any suitable system having any suitable system configuration. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 9, at (302), the method 300 may include monitoring, with a computing device, a location of a work vehicle within a storage volume for crop material as a work vehicle traverses a layer of crop material within the storage volume. For instance, as described above, when a work vehicle 10 traverses a layer of crop material within a silage heap, the controller 110 may be configured to monitor the location of a work vehicle 10 within the silage heap based on coordinates or other location data received from a location sensor 104.

Additionally, at (304), the method 300 may include determining, with the computing device, a current density of the layer of crop material as the work vehicle traverses the layer of crop material. For instance, as described above, as the work vehicle 10 traverses the layer of crop material, the controller 110 may be configured to determine the current density of the layer of crop material based on coordinates or other location data received from the location sensor 104 and/or vision-based data received from a vision-based sensor 106.

Moreover, as shown in FIG. 9, at (306), the method 300 may include controlling, with the computing device, an operation of the work vehicle based on the monitored location and the determined current density such that the work vehicle compresses the layer of crop material. For instance, as described above, the controller 110 may be configured to control the operation of the work vehicle 10, such as the operation of the engine 20, the transmission 22, the steering actuator 24, and/or the implement actuator(s) 102, in a manner that compresses a layer of the crop material based on the monitored location and the determined current density.

It is to be understood that the steps of the methods 200, 300 are performed by the controller 110 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 110 described herein, such as the methods 200, 300, is implemented in software code or instructions which are tangibly stored on a tangible computer readable medium. The controller 110 loads the software code or instructions via a direct interface with the computer readable medium or via a wired and/or wireless network. Upon loading and executing such software code or instructions by the controller 110, the controller 110 may perform any of the functionality of the controller 110 described herein, including any steps of the methods 200, 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A method for distributing crop material for ensilage, the method comprising:
   determining, with a computing device, a storage volume for the crop material;
   dividing, with the computing device, the determined storage volume into a plurality of planes, each plane of the plurality of planes spaced apart from each other plane of the plurality of planes along a vertical direction; and
   controlling, with the computing device, an operation of at least one of a work vehicle or an associated implement in a manner that distributes a portion of the crop material on a given plane of the plurality of planes.

2. The method of claim 1, wherein controlling the operation of the at least one of the work vehicle or the associated implement comprises controlling, with the computing device, the operation of the at least one of the work vehicle or the associated implement in a manner that distributes the portion of the crop material on the given plane such that the portion of the crop material defines a predetermined height along the vertical direction.

3. The method of claim 2, wherein the predetermined height comprises a distance between the given plane and an adjacent plane of the plurality of planes.

4. The method of claim 2, further comprising:
   monitoring, with the computing device, a current height of the portion of the crop material on the given plane; and
   controlling, with the computing device, the operation of the at least one of the work vehicle or the associated implement based on the monitored current height.

5. The method of claim 2, further comprising:
   identifying, with the computing device, a plurality of measurement points on the given plane;
   determining, with the computing device, a current height of the crop material at each measurement point of the plurality of measurement points;
   determining, with the computing device, a gradient vector associated with a height of the crop material at a given measurement point of the plurality of measurement points and a height of the crop material at an adjacent measurement point of the plurality of measurement points; and
   controlling, with the computing device, the operation of the at least one of the work vehicle or the associated implement based on the determined gradient vector.

6. The method of claim 2, wherein the predetermined height corresponds to an uncompressed or partially compressed height of the portion of the crop material.

7. The method of claim 1, further comprising:
   monitoring, with the computing device, a surface roughness of the portion of the crop material on the given plane; and
   controlling, with the computing device, the operation of the at least one of the work vehicle or the associated implement based on the monitored surface roughness.

8. The method of claim 1, wherein controlling the operation of the at least one of the work vehicle or the associated implement comprises controlling, with the computing device, at least one of a speed of the work vehicle, a direction of travel of the work vehicle, or an orientation of the implement.

9. A system for distributing crop material for ensilage, the system comprising:
   a work vehicle;
   an implement coupled to the work vehicle, the implement configured to distribute the crop material; and
   a controller configured to:
      determine a storage volume for the crop material;
      divide the determined storage volume into a plurality of planes, each plane of the plurality of planes spaced apart from each other plane of the plurality of planes along a vertical direction; and
      control an operation of at least one of the work vehicle or the implement in a manner that distributes a portion of the crop material on a given plane of the plurality of planes.

10. The system of claim 9, wherein the controller is further configured to control the operation of the at least one of the work vehicle or the implement in a manner that distributes the portion of the crop material on the given plane such that the portion of the crop material defines a predetermined height along the vertical direction.

11. The system of claim 10, wherein the predetermined height comprises a distance between the given plane and a subsequent plane of the plurality of planes.

12. The system of claim 10, further comprising:
   a sensor configured to capture data indicative of a current height of the portion of the crop material on the given plane, the sensor communicatively coupled the controller, the controller further configured to monitor the current height of the portion of the crop material on the given plane based on data received from the sensor and control the operating parameter based on the monitored current height.

13. The system of claim 12, wherein the sensor comprises a location sensor.

14. The system of claim 10, further comprising:
a sensor configured to capture data indicative of a current height of the portion of the crop material on the given plane, the sensor communicatively coupled the controller, the controller further configured to:
  identify a plurality of measurement points on the given plane;
  determine a current height of the crop material at each measurement point of the plurality of measurement points based on data received from the sensor;
  determine a gradient vector associated with a first height of the crop material at a given measurement point of the plurality of measurement points and a second height of the crop material at an adjacent measurement point of the plurality of measurement points; and
  control the operation of the at least one of the work vehicle or the associated implement based on the determined gradient vector.

15. The system of claim 10, wherein the predetermined height corresponds to an uncompressed or partially compressed height of the portion of the crop material.

16. The system of claim 9, further comprising:
a sensor configured to capture data indicative of a surface roughness of the portion of the crop material on the given plane, the sensor communicatively coupled the controller, the controller further configured to monitor the surface roughness of the portion of the crop material on the given plane based on data received from the sensor and control the operating parameter based on the monitored surface roughness.

17. The system of claim 16, wherein the sensor comprises a vision-based sensor.

18. The system of claim 9, wherein the controller is further configured to control at least one of a speed of the work vehicle, a direction of travel of the work vehicle, or an orientation of the implement.

* * * * *